Jan. 9, 1945.　　　　J. W. BEECHER　　　　2,367,087
SEAL FOR DIFFERENTIAL PRESSURE GAUGES
Filed Feb. 16, 1942
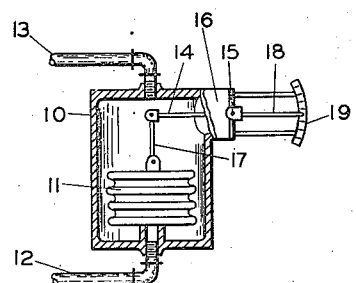
FIG. 1
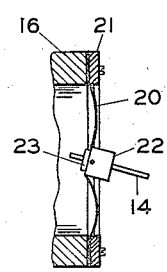
FIG. 6
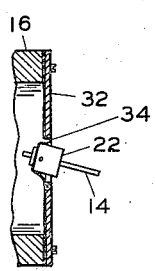
FIG. 7
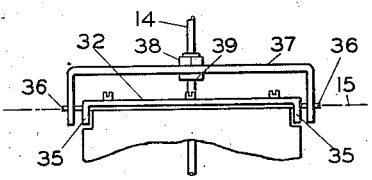
FIG. 4
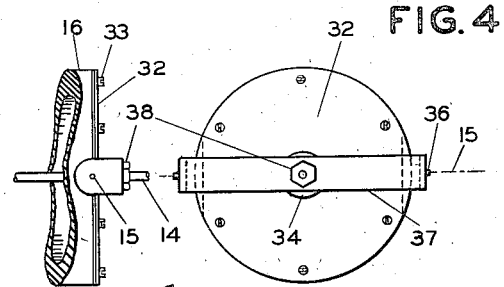
FIG. 2　　FIG. 3
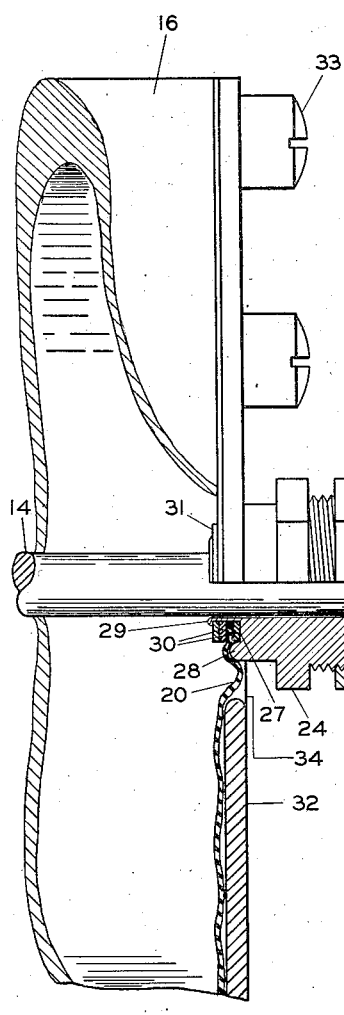
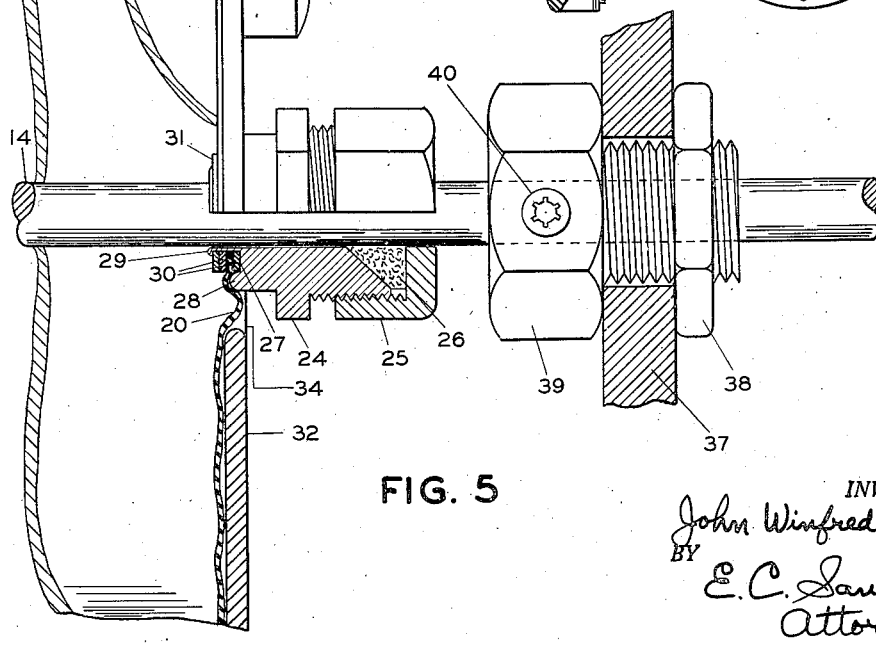
FIG. 5
INVENTOR.
John Winfred Beecher
BY E. C. Sanborn
Attorney Patented Jan. 9, 1945

2,367,087

UNITED STATES PATENT OFFICE 2,367,087

SEAL FOR DIFFERENTIAL PRESSURE GAUGES

John Winfred Beecher, Waterbury, Conn., assignor to The Bristol Company, Waterbury, Conn., a corporation of Connecticut Application February 16, 1942, Serial No. 431,044

3 Claims. (Cl. 73—407)

This invention relates to sealing devices for differential pressure gauges, and more especially to means for sealing the interior of such a gauge from the external atmosphere without interfering with the free transmission of movement from a pressure-responsive element within said gauge to an indicating, recording, or controlling member outside the housing. A very common form of differential pressure gauge embodies a manometer in which a float or inverted bell rests upon the surface of a body of liquid and changes its level with variations in the differential between fluid pressures applied to different parts of the apparatus. In another form, use is made of a resilient metallic bellows housed in an enclosed chamber and adapted to vary its longitudinal dimension in response to changes in the differential between internal and external pressures. In cases where the differential to be measured is of a relatively low magnitude, it frequently occurs that the force available for deflecting the moving element is limited, with the consequent result that any form of sealing device involving a stuffing box or a gland in which a shaft is required to rotate may introduce sufficient friction to cause errors in the reading. It has been the practice to a limited extent in instruments of this class to provide for sealing purposes a diaphragm formed of extremely flexible material, such as silk fabric, impregnated with synthetic rubber, and to extend this diaphragm between a circular clamping ring on the body of the instrument and a hub mounted on the deflecting part, the arrangement being such that the deflecting part where it passes through the diaphragm would tend to rotate about a line lying substantially in the diameter of the circular diaphragm. This combination while providing a number of advantageous features has been subject to certain handicaps which will hereinafter be more fully set forth.

It is an object of this invention to provide for sealing purposes a diaphragm assembly which shall be devoid of tendency to introduce errors in the reading of the instrument with variations in static pressure.

It is a further object of the invention to provide a diaphragm assembly which may be readily fabricated and easily assembled and dismantled without affecting the accuracy of the instrument.

It is a further object to provide a device of the above nature which shall be inexpensive in construction, durable in use, and readily replaceable.

In the drawing:

Fig. 1 is a side elevation, partly in section, of a manometer of the type to which the invention is especially adaptable.

Figs. 2, 3 and 4 are side, end, and top elevations, respectively, of a sealing device embodying the principles of the invention.

Fig. 5 is a side elevation to an enlarged scale showing details of construction of the invention.

Figs. 6 and 7 are sectional side elevations of sealing devices showing respectively the prior art and the present invention.

Referring now to the drawing:

In Fig. 1 is shown a differential manometer of the type having a closed chamber 10, housing a vertically-disposed resilient bellows member 11 fixed at its lower end and adapted to be subjected to independent internal and external fluid pressure through conduits 12 and 13, respectively, whereby the longitudinal dimension of said bellows member will vary in response to the difference of said pressures producing a corresponding vertical displacement of its upper end. A horizontally-disposed lever arm 14 is pivoted for rotation about a horizontal axis 15 lying on the diameter of a circular opening defined by the plane end or rim of an extension 16 formed on the side-wall of the chamber 10. Said lever 14 is attached at its inner end to the movable end of the bellows member 11 by means of a link 17, and bears on its outer end an index or pointer 18 adapted to traverse a graduated scale 19, thereby providing on said scale a measure of the deflection of said bellows, and thus of the pressure differential under measurement.

For the purpose of providing a seal between the atmosphere and the space within the chamber 10 without interfering with free deflection of the lever arm 14 about its axis of rotation, it has been the custom, in manometers of this type, to place across the circular opening in the chamber wall a diaphragm formed of thin flexible sheet material, such as silk fabric impregnated with synthetic rubber or the like, so disposed with respect to the lever arm that the axis of rotation of said arm lies in a diameter of said diaphragm. A sectional view of such an arrangement is shown in Fig. 6, wherein a diaphragm 20 is clamped by means of a ring 21 across the circular opening in the extension 16 of chamber 10. A gas-tight attachment of the diaphragm 20 to the lever arm 14 is provided by means of a gland 22 tightly encircling the lever-arm 14 and clamping the diaphragm against its inner flat surface by means of a nut 23.

The action of such an arrangement under operating conditions is illustrated in Fig. 6, where the diaphragm is shown as distorted under a slight internal pressure, such as might be met with in the service for which the device is intended. It will be seen that the diaphragm is bulged outward, tending to develop a turning moment upon the lever 14, about its axis of rotation. When the lever arm is in such a position that the flat inner surface of the gland 22 is parallel to the plane of the diaphragm it may be assumed that the turning moment is equalized, and that there is no tendency to deflect said arm about its axis of rotation. With the arm in a deflected position, however, as shown for example in Fig. 6, it will be seen that the turning moment due to the action of the bulged portion of the diaphragm pulling on the gland on the upper side of the axis of rotation will differ from that on the lower side, with a consequent tendency to affect the measuring torque upon the instrument, and introduce an error in measurement.

The invention is directed to means for eliminating or minimizing to a negligible degree the effect of diaphragm pull upon the directive forces of the instrument. For mechanical reasons, it has been found impracticable to reduce the dimensions of the gland 22 to such a value as to eliminate the turning moment due to the pull of the bulged diaphragm acting upon its edges; and, even were it possible to reduce the area of engagement between the diaphragm and the moving part to a magnitude no greater than the sectional area of the lever 14, there would still be the tendency for uneven distribution of stresses from the bulged diaphragm when the lever assumes any position other than the one directly perpendicular to the mounting of the diaphragm. It will be obvious, moreover, that a reduction in the area of the diaphragm exposed to fluid pressure will tend to reduce the longitudinal force applied to the lever arm; but it has been found that if this area be reduced to such a magnitude as to render negligible the undesirable effects, not only is the flexibility of the diaphragm seriously inhibited, but the physical dimensions of the clamping ring become so small as to render assembly and servicing extremely difficult in the factory and almost impossible in the field.

In Fig. 5 is shown to an enlarged scale means embodying the principles of the invention and which have been found effective in eliminating the trouble due to stresses in the diaphragm without at the same time introducing any undesirable features. The lever arm 14 passes with a clearance fit through a stuffing box 24 and is secured thereto by means of a compression nut 25, acting upon suitable resilient packing material 26 whereby a firm clamping action is obtained between the stuffing box and the lever arm, the whole corresponding to the gland 22 shown in Figs. 6 and 7. The stuffing box 24 is provided at its inner end with a recess 27 and with a rounded annular edge portion 28, and also with a thin collar portion 29 adapted to encircle the lever arm 14. The diaphragm 20 is secured to the stuffing box 24 by being clamped between two washers 30 of resilient material, such as synthetic rubber, which are forced into the recess 27 in clamping engagement with the diaphragm 20 by means of a metallic washer 31 secured in turn by the collar portion 29 being upset or spun over. A clamping plate 32 of substantially circular exterior conformation is adapted to cover the opening in the extension 16 of the chamber 10 and to be secured thereto as by screws 33, retaining the outer edge of the diaphragm 20 as a gasket and thereby sealing said opening. Centrally located in the plate 32 is a circular opening 34 materially smaller than the opening in the extension 16 of the chamber, to provide clearance from the stuffing box 24 in all its operative positions, and having smoothly rounded inwardly directed edges. In securing the diaphragm 20 to the face of the opening in the chamber extension 16, care is taken that it shall be placed against the interior surface of the plate 32 in a slack condition, so that the arm 14 may assume any operative position without straining the material of the diaphragm.

I so mount the lever arm 14 as to provide for freedom of deflection thereof about an axis lying substantially in the plane of the rim of the extension 16, for which purpose there may be employed the mounting arrangement shown in Figs. 2, 3 and 4. The clamping plate 32 is provided with lugs 35 projecting over the edges of the surface against which the diaphragm 20 is to be clamped and carrying pivot members 36 lying on the line of the axis of rotation 15. The latter lies substantially in the plane of the circular opening formed by the end of extension 16 and on a diameter of said opening. By "substantially" in the plane of said opening, I mean in the space terminating at one end in the plane of extension 16 and at the opposite end in the plane of the inner surface of the plate 32. A bow or bridge piece 37 is adapted to span the clamping plate 32 and rotatably to engage said pivot members whereby said bow piece 37 may swing through a limited angle about the axis 15. The lever arm 14 passes through the center of an axially bored hollow bolt 38 maintained in clamping engagement with the bow 37 by a cooperating nut 39, and is secured to said hollow bolt by means of a set screw 40, whereby said lever arm is made integral with said bow and adapted to swing therewith about the axis 15.

The operation of the device when constructed with the improved clamping plate will be seen by reference to Fig. 5 or Fig. 7. The diaphragm 20, having been assembled in an unstressed condition, will be free for a certain amount of motion in the hole 34 of relatively small diameter, providing little more than a bare clearance between the plate 32 and the inner part of stuffing box 24. Thus, while internal pressure may act to force a small annular portion of the diaphragm 20 into the opening between the plate and the stuffing box, yet the total area of the part of the diaphragm so stressed is so small that the force in a direction perpendicular to said diaphragm becomes of negligible magnitude. Thus, while, as shown in Fig. 7, the directions of pull of the diaphragm on the two sides of the stuffing box assembly are slightly different, tending to set up a turning moment about the axis of rotation, yet the total magnitude of the force available is such as to render of negligible magnitude the differential effect responsible for the turning moment. With this arrangement, therefore, there has been provided a sealing means which, while of such mechanical dimensions as to permit of ready manipulation by service men and others either in the factory or the field, is characterized by the reduction of objectionable stresses to negligible proportions.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

Having described my invention, what I claim is:

1. In a manometer having an internal chamber wherein the pressure differs from external atmosphere, an element movable within said chamber, and a lever connected to said element and extending through an opening in said chamber for transmitting motion from said element to the exterior of said chamber; a seal for said opening comprising a flexible slack diaphragm secured to a portion of said chamber and to said lever, and a backing plate secured to a portion of said chamber and positioned on the side of said diaphragm toward the lower of said pressures and thereby adapted to support said diaphragm against the higher of said pressures.

2. In a manometer having an internal chamber wherein the pressure differs from that of the external atmosphere, an element movable within said chamber, a substantially plane rim defining an opening in the wall of said chamber, and a lever adapted to transmit motion from said element to instrumentalities external to said chamber by rotation through a limited angle about an axis lying substantially in the plane of said rim; a seal comprising a flexible slack diaphragm secured to said rim and to said lever-arm, and a backing plate secured to a portion of said chamber and positioned on the side of said diaphragm toward the lower of said pressures and thereby adapted to support said diaphragm against the higher of said pressures.

3. In a manometer having an internal chamber wherein the pressure differs from that of the external atmosphere, an element movable within said chamber, a substantially plane rim defining an opening in the wall of said chamber, a lever adapted to transmit motion from said element to instrumentalities external to said chamber by rotation through a limited angle about an axis lying substantially in the plane of said rim; a seal comprising a flexible diaphragm secured to said rim and to said lever, and a backing plate disposed on the side of said diaphragm toward the lower of said pressures, said backing plate being secured to said rim and having an opening surrounding said lever, the diameter of said opening being materially smaller than that of said rim, and said diaphragm being secured to said rim in an unstressed condition providing slack therein adjacent said opening.

JOHN WINFRED BEECHER.